C. F. EATON, Jr.
CALCULATING INSTRUMENT.
APPLICATION FILED OCT. 13, 1919.
1,407,134.
Patented Feb. 21, 1922.
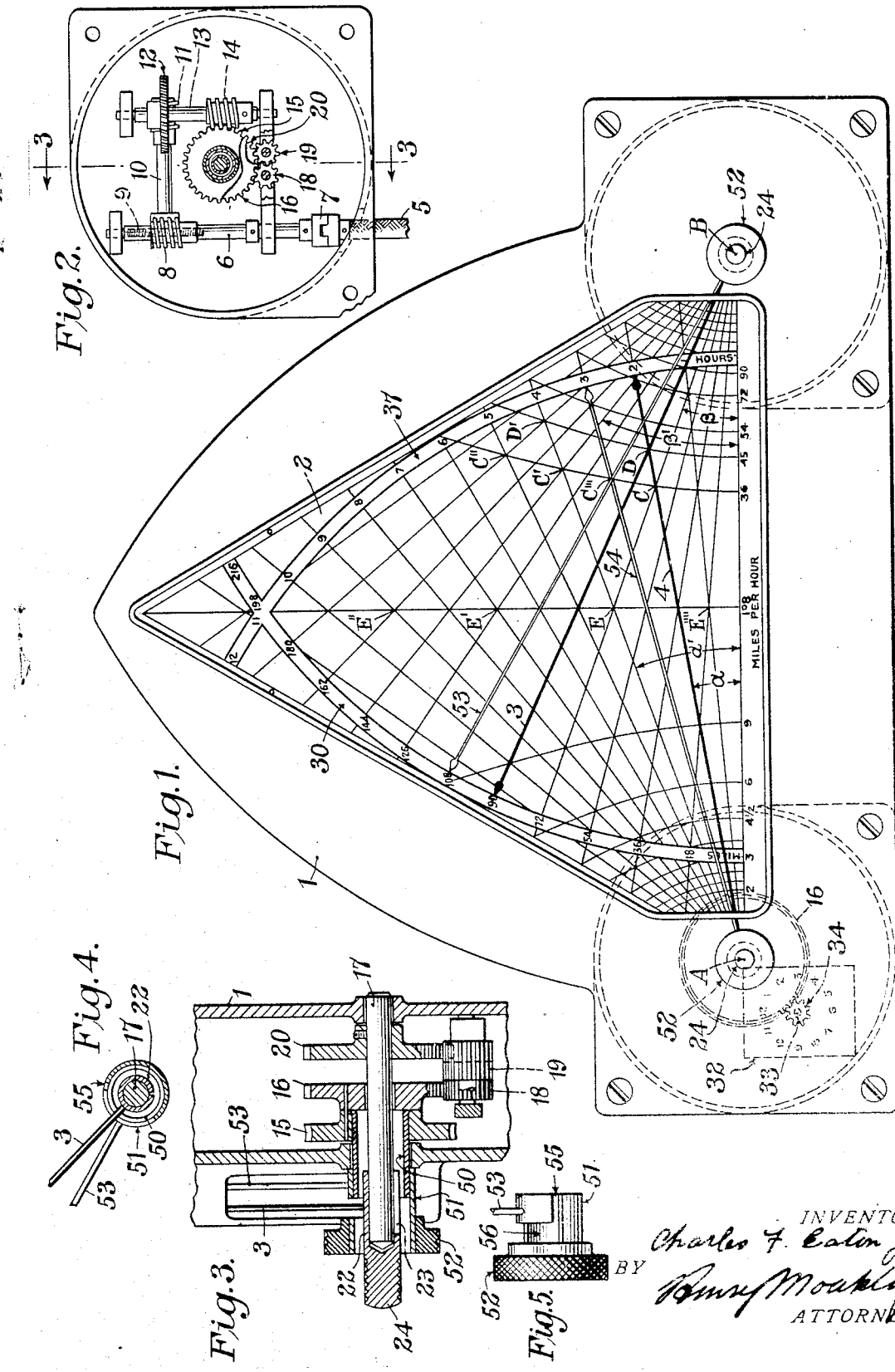

UNITED STATES PATENT OFFICE.

CHARLES F. EATON, JR., OF NEW YORK, N. Y.

CALCULATING INSTRUMENT.

1,407,134.         Specification of Letters Patent.    Patented Feb. 21, 1922.

Application filed October 13, 1919. Serial No. 330,192.

*To all whom it may concern:*

Be it known that I, CHARLES F. EATON, Jr., a citizen of the United States, residing at 371 East 204th Street, in the borough of Bronx, State of New York, have invented new and useful Improvements in Calculating Instruments, of which the following is a specification.

This invention relates to calculating machines and more particularly to an instrument for giving a direct reading of the quotient of two factors one of which increases or decreases at a variable rate.

It is one of the objects of the invention to provide a calculating instrument of this character which is adapted to give a direct reading of the average speed at which a part rotates or travels as for example, the average speed at which a vehicle has traveled for a predetermined time interval. The invention is also capable of use to determine the speed at which a vehicle or other part should travel in order to cover a predetermined distance in a predetermined time interval, or both of these uses may be combined in a single instrument.

I am aware that it had been proposed heretofore to provide an instrument of this character and in my copending application filed June 6th, 1918, Serial No. 238,472, I have described one form of instrument which may be used for this purpose. It is the object of the present invention to provide a more simple type of mechanism for obtaining the quotient between the two variable factors whether these factors be the distance and time as required by an average speedmeter or obtaining the quotient of any two other factors which are variable and a continuous reading of the quotient is desired.

In the preferred form of the invention, the device or instrument contemplates two angularly movable pointers which are arranged so that they intersect each other, which pointers are driven directly proportional to the two factors whose quotient is to be determined. Associated with the pointers is a chart from which the quotient of the two factors may be read at a point on the chart directly beneath the point of intersection of the two pointers, the chart being calibrated according to the use to which the instrument is used as for example in miles per hour where it is used as an average speedmeter.

The invention also contemplates an instrument of the character described in which the pointers may be easily reset and in which the pointers and chart may be arranged so that they will give in the case of its adaptation to a vehicle, an average speed at which the vehicle should travel to cover a predetermined distance in a predetermined time interval as well as the average speed at which the vehicle has travelled for a predetermined time interval.

The invention also comprises the various constructions and combinations which will be hereinafter described and will be particularly pointed out in the appended claims. In the drawing—

Figure 1 is a plan of the instrument constructed in accordance with the principle of the invention, Figure 2 is a detail of the actuating mechanism, Figure 3 is a detail of the pointers and the actuating mechanism, Figures 4 and 5 are details of the pointer construction.

Referring first to the mathematical principle upon which the instrument is constructed, let us assume that in Fig. 1, the points A-B represent a fixed base line and that upon this base line a series of triangles are constructed and in which the angles between the base line and the two other sides of the triangles are directly proportional to the value of the two factors whose quotient it is desired to be determined. As for example, in the triangle A-B-C in which A-B is the base line, the angle $\alpha$ between the sides A-B and A-C is directly proportional to the time interval and the angle B between the sides A-B and B-C directly proportional to the distance in which a vehicle has travelled or as shown in this view $\dfrac{B}{\alpha} = \dfrac{3}{2}$.

Let us assume another triangle whose apex is at C', here again we have two angles $\alpha'$ and B' in which the relation is as before $\dfrac{B'}{\alpha'} = \dfrac{3}{2}$. If other triangles are assumed upon the same base line in which the angles which their sides make with the base line are in the relation $\dfrac{3}{2}$ as for example—triangles A-B-C'', A-B-C''', etc., it will be found that the points for C'', C''', C''', etc., define a curve which is the locus of the intersection of the sides of all triangles whose angles bear the relation of $\frac{3}{2}$. If a series of triangles A-B-D and A-B-D' are laid out in which the angles with their sides bear the relation of $\frac{5}{2}$ it will be found that a curve through the points D and D' will be the locus of all triangles whose angles bear the relation of $\frac{.5}{2}$. In the same manner if a series of triangles A-B-E and A-B-E', A-B-E'', etc., are constructed, the angles in which two sides form with the base line are equal, a straight line is obtained which is the locus of the apexes all triangles whose angles bear the relation of $\frac{1}{1}$ to each other.

It is therefore evident from the above, that a chart may be plotted consisting of a line passing through the points E, E' and E'' and a series of curves passing through points C, C', C'' etc. and D, D', etc., which chart will give the locus of the apexes all triangles in which the angles which the sides of the triangles make with the base line bear a definite relation to each other. If we now assume that for the sides of the triangle two pointers are substituted and one is angularly displaced so that its angle with the base line is proportional to the time and the other pointer is shifted so that its angle is proportional to the distance, it is evident that from the intersection of the pointers a direct reading of the relation between the angles which the sides of the triangles form with the base line may be obtained from the chart which is produced as above described.

Referring now to the manner in which this principle is utilized in an instrument, the casing of the instrument is shown at 1 and a triangular shaped chart at 2 which may be protected by a glass cover if so desired. The casing 1 carries two pointers 3 and 4 which are pivoted at the points A and B, the pointer 3 is adapted to be actuated so that its angular displacement is proportional to the distance and the pointer 4 so that its angular displacement is proportional to the time.

Any desired mechanism may be utilized for this purpose and in Fig. 2, a mechanism for driving the pointer 3 is disclosed which comprises a flexible shaft 5 which is adapted to be connected to the wheel of a vehicle so that it rotates in synchronism therewith; this shaft is connected to a shaft 6 through a coupling 7. The shaft 6 carries a worm 8 which in turn meshes with a worm wheel 9 upon the shaft 10 which shaft carries a second worm 11 which meshes with a worm wheel 12 upon a shaft 13. The shaft 13 also carries a worm 14 which meshes with a worm wheel 15 which is shown more clearly in Fig. 3 of the drawing. The worm wheel 15 has secured thereto a spur gear 16 which is loosely mounted upon a shaft 17 which is rotatively mounted upon bearings in the casing 1. This gear 16 meshes with a pinion 18 which in turn meshes with a pinion 19 (see Fig. 2), the latter pinion driving a gear 20 secured to the shaft 17. This construction causes a rotation of the gears 16 and 20 in opposite directions and at the same speed, the purpose of which will be later described. The shaft 17 carries at its outer end a sleeve 22 which is preferably slotted at 23 to cause it to frictionally engage the shaft 17 so that under normal conditions it will rotate with it but will permit it to be rotated independently of the shaft by the knurled head 24 when it is desired to reset the pointer 3 which is carried by the sleeve 22 as will be clear from Fig. 3.

In the particular embodiment of the invention described, the pointer 3 is designed to be driven through an angle of 60 degrees when the vehicle has covered 216 miles. A scale 30 which co-operates with the pointer 3 indicates the distance which the vehicle has travelled, as for example, the pointer 3 in the position shown in Fig. 1 indicates that the vehicle has travelled 90 miles.

Referring now to the mechanism for actuating the pointer 4, there is shown in dotted lines a clock movement 32 upon which the shaft for actuating the hour hand of the clock is designated 33. The mechanism for actuating the pointer 4 from this hour shaft is similar to that shown in Fig. 3 with the exception that a gear 34 upon the shaft 33 meshes with the spur gear 16 shown in this view, the worm wheel 15 and the triple worm reduction shown in Fig. 2 being unnecessary. The gear ratios between the gears 33 and 16 are such that the pointer 4 will be actuated through 60 degrees in a period of 12 hours. The pointer 4 also co-operates with a time scale 37 from which the time that the instrument has been in operation may be read. The chart 2 is therefore calibrated so that a rate of 18 miles is unity or in other words $\frac{B}{a} = \frac{1}{1} = \frac{216}{12} = 18$ miles per hour.

In the operation of the instrument, the pointers 3 and 4 are first set so that they are in coincidence with the base line A-B. This is readily accomplished by means of the knurled heads 24 which carry these pointers since the sleeve 22 frictionally engages the shaft 17 and may be moved independently of it. If we assume, that the vehicle has been in operation for 1 hour and the vehicle has travelled 18 miles during this 1 hour interval, then the pointers 3 and 4 will intersect at the point E'''' in which angle $\frac{B}{\alpha}=\frac{1}{1}=\frac{18}{1}=18$. From the above quotient it is evident that the line passing through E, E', etc., should be the locus of points in which the average speed is 18 miles per hour. This is clearly evident since if for example the point E is taken, it is evident that the pointer 3 will then indicate 72 miles and the point 4 four hours which gives an average speed of 18 miles an hour. Assume that the pointer 4 and the pointer 3 have been driven so that they intersect at the point D as before described, the points D, D', are the locus of all points in which $\frac{B}{\alpha}=\frac{5}{2}$ and therefore $\frac{B}{\alpha}=\frac{5}{2}=45$ miles per hour, or in other words, a curve marked 45 is the curve which shows the locus of intersection at which the average speed is equal to 45 miles per hour. This is clear from Fig. 1. since with the pointers intersecting at D the pointer 3 indicates a distance of travel of 90 miles and the pointer 4 a time of 2 hours which is equal to 45 miles an hour. The curves for 2, 3, 4½, 6, 9, 18, 36, 45, 54, 72 and 90 miles per hour are shown on the drawing and are calibrated in the same manner and it is evident from the above description that the curves for other average speeds of intermediate values could be obtained as already described and a direct reading of the average speed obtained by reading the chart directly beneath the intersection of the two pointers.

Referring now to the construction of the instrument whereby in addition to the average speed it may be utilized to determine the average speed at which a vehicle should travel to cover a predetermined distance in a predetermined time; as before described, the gear wheel 16 rotates at the same speed and in the opposite direction to the gear 20 which actuates the pointers 3 and 4. This gear 16 carries a bushing 50 over the outer end of which is telescoped a sleeve 51; the sleeve 51 carries a knurled head 52 and also carries a pointer 53; the sleeve 51 is slotted as shown in Fig. 5 which slot is somewhat L shaped in form, having a longitudinal slot 55 therein which permits the sleeve to pass the pointer 3 when the sleeve 51 is placed over the end of the bushing 50. The pointer 3 is free to move independently of the pointer 53 within the slot 56 as will be clear from Fig. 4. The pointer 54 which is actuated from the clock 32 is of a similar construction. In the operation of this part of the device, the head 52 is turned so that the pointer 53 is set to the total distance to be covered as for example as shown in Fig. 1 it is set for 108 miles. In the same manner, the pointer 54 is set for the total time to be consumed in traveling the 108 miles and is shown set for 3 hours. It is therefore evident that the intersection of these two pointers should lie upon the curve designated 36 miles which is equal to $\frac{108}{3}$ which it does as is seen from Fig. 2 of the drawing. As the mechanism then operates, the pointers 53 and 54 travel downwardly since the gear 16 rotates in the opposite direction to the gear 20 and the intersection of the two pointers when read on the chart 2, will give the average speed at which the vehicle should travel in order to complete the remaining distance in the remaining time.

It is evident from the above description that by choosing the gear ratios other than described, other values than 18 may be selected as unity and the chart would be calibrated accordingly. It is also evident that constructional details other than the ones shown may be utilized and it is not the intention to limit the case to the specific embodiment or use shown and described but only to the scope of the appended claims.

It is also evident that if desired the pointer 3 may be connected to the sleeve 50 and the pointer 53 to the sleeve 22 in which instance a reversal of rotation of the flexible shaft 5 and the gear mechanism connected to the clock 32 would be required, the operation would then be the same as in the construction already described.

I claim,

1. In an instrument of the class described, a pair of angularly displaceable intersecting members, and a chart co-operating with said members having graphs, each one of which defines the locus of the points of intersection of said members at which the angular displacements of said members bear the same relation to each other.

2. In an instrument of the class described, a pair of angularly displaceable intersecting members, and a chart co-operating with said members including a series of graphs, each one of which defines the locus of the points of intersection of said members at which the ratio between the amounts of angular displacements of said members are equal.

3. In an instrument of the class described, a pair of angularly displaceable intersecting members, means for moving one of said members in proportion to one factor, means for moving the other of said members in proportion to a second factor, and a chart having graphs, each of which defines the locus of the points of intersection of said members at which the ratio between said two factors is the same.

4. In an instrument of the class described, a pair of angularly displaceable intersecting members, means for moving one of said members proportional to distance, means for moving the other of said members in proportion to time, and an average speed scale readable at the point of intersection of said members.

5. In an instrument of the class described, a pair of angularly displaceable intersecting members, means for moving one of said members proportional to distance, means for moving the other of said members proportional to time, and a chart having graphs representing average speeds readable at the point of intersection of said members.

6. In an instrument of the class described, a pair of angularly displaceable intersecting members, gearing for rotating one of said members in accordance with the displacement of a moving part, means for rotating the other of said members in accordance with time and a chart readable at the point of intersection of said members for giving the ratio between the total displacement of said moving part and the total time.

7. In an instrument of the class described, a pair of angularly displaceable intersecting members adapted to be driven in accordance with the distance traveled by a vehicle and in accordance with the time respectively, an average speed chart associated with said members, means for setting one of said members in accordance with the total distance which the vehicle is to cover, means for setting the other of said members in accordance with the total time for covering the total distance, whereby said intersecting members when read from said chart at their point of intersection will give the average speed at which the vehicle should travel to cover the remaining distance in the remaining period of time.

8. In an instrument of the class described, a pair of angularly displaceable intersecting pointers, gearing for rotating said pointers, said pointers being movable independently of said gearing for resetting said pointers and a chart readable at the point of intersection of said pointers for indicating the ratio between the angular displacement of said pointers.

9. In an instrument of the class described, an angularly displaceable pointer, means for moving said pointer in accordance with the distance traveled by a vehicle, a scale associated with said pointer for indicating the distance which the vehicle has traveled, a second angularly displaceable pointer intersecting said first named pointer, means for displacing said pointer proportional to the time, and a scale for indicating the time and an average speed chart associated with said pointers and readable at their point of intersection.

10. In an instrument of the class described, an angularly displaceable pointer, means for moving said pointer in accordance with the distance traveled by a vehicle, a scale associated with said pointer for indicating the distance which the vehicle has traveled, a second angularly displaceable pointer intersecting said first named pointer, means for displacing said pointer proportional to the time, a scale for indicating the time and an average speed chart associated with said pointers and readable at their point of intersection; said pointers being resettable independently of the means for angularly displacing them.

CHARLES F. EATON, Jr.